(12) United States Patent
Umetani

(10) Patent No.: US 8,733,488 B2
(45) Date of Patent: May 27, 2014

(54) ELECTRIC VEHICLE WITH BUILT-IN BATTERY PACK

(71) Applicant: Mitsubishi Jidosha Kogyo Kabushiki Kaisha, Tokyo (JP)

(72) Inventor: Tatsuhiko Umetani, Okazaki (JP)

(73) Assignee: Mitsubishi Jidosha Kogya Kabashiki Kaisha, Tokyo (JP)

( * ) Notice: Subject to any disclaimer, the term of this patent is extended or adjusted under 35 U.S.C. 154(b) by 0 days.

(21) Appl. No.: 13/793,615

(22) Filed: Mar. 11, 2013

(65) Prior Publication Data

US 2013/0248263 A1    Sep. 26, 2013

(30) Foreign Application Priority Data

Mar. 23, 2012    (JP) .................................. 2012-068282

(51) Int. Cl.
*B60R 16/04*    (2006.01)

(52) U.S. Cl.
USPC ....................................................... 180/68.5

(58) Field of Classification Search
None
See application file for complete search history.

(56) References Cited

U.S. PATENT DOCUMENTS

| 4,532,953 | A | 8/1985 | Rysewyk |
| 6,189,635 | B1 * | 2/2001 | Schuler et al. ............... 180/68.5 |
| 7,316,406 | B2 * | 1/2008 | Kimura et al. ............. 280/6.157 |
| 2007/0034560 | A1 * | 2/2007 | Janik et al. .................... 210/248 |

FOREIGN PATENT DOCUMENTS

| EP | 2 000 345 A1 | 12/2008 |
| JP | 10-076979 A | 3/1998 |
| JP | 2011-173447 A | 9/2011 |
| JP | 2011-192592 A | 9/2011 |

OTHER PUBLICATIONS

Extended European Search Report for European Patent Application No. 13159601.7 dated Nov. 7, 2013, in English language.

* cited by examiner

*Primary Examiner* — John Walters
*Assistant Examiner* — James Triggs
(74) *Attorney, Agent, or Firm* — Birch, Stewart, Kolasch & Birch, LLP

(57) ABSTRACT

An electric vehicle includes a vehicle body and a battery pack. The vehicle body has in a lower portion thereof a sign showing a specific position to be jacked up. The battery pack is mounted on the lower portion of the vehicle body and includes a bottom wall having a mark showing a position where a liquid draining hole communicating with an inside of the battery pack is to be bored. The mark is disposed at a position lower than the specific position within the vehicle body in a state where the vehicle body is inclined by jacking up the specific position.

13 Claims, 9 Drawing Sheets

ELECTRIC VEHICLE WITH BUILT-IN BATTERY PACK

BACKGROUND OF THE INVENTION

1. Field of the Invention

The present invention relates an electric vehicle including a mechanism for completely discharging a battery pack incorporated therein.

2. Description of the Related Art

When an electric vehicle is submerged and a lot of water flows into a built-in battery pack, or when, due to vehicle collision, the battery pack is broken and its electrolyte leaks, a current may be leaked. In this case, when the water or electrolyte remains within the battery pack, there is a danger that an operator or the like for moving this electric vehicle can be electrically shocked. Therefore, the battery pack must be discharged completely.

When the battery pack is submerged, firstly, mud or cloudy water having invaded therein must be drained and, thereafter, the battery pack is filled with water again and must be left until the battery pack discharges electricity completely. And, also when the electrolyte is leaking, after the electrolyte is drained, water is filled into the battery pack to discharge electricity in the battery pack. In both cases, the water within the battery pack is drained after the electricity is discharged.

There is known a vehicle battery pack having a mechanism for draining invaded water. This battery pack includes a cooling device for cooling battery cells. The cooling device is disposed substantially centrally of the vehicle in its width direction and is used to circulate cool air within the battery pack. In this battery pack, the cooling device includes a drain for draining condensed water. In order to prevent the water against backflow from the drain, a check valve is provided on the outlet of the drain.

Also, in consideration of a case where a battery pack is taken apart for recycling, there is provided a battery pack which includes in its connecting portion a slit for guiding a tool. In this battery pack, multiple unit cells are covered with upper and lower case members. The tool is guided along the slit to cut a hook engaging the upper and lower case members with each other, whereby the unit cells can be taken out from the cases.

[Patent Document 1] JP-A-2011-173447
[Patent Document 2] JP-A-2011-192592

SUMMARY OF THE INVENTION

When the battery pack is submerged in water, the amount of mud or cloudy water having invaded therein is larger than that of the condensed water that is produced by the cooling device. To drain the mud or cloudy water from the battery pack, there is necessary a hole larger than the drain for draining the condensed water of the cooling device. Therefore, while securing the safety of the operation, the hole must be bored in the battery pack. In this case, in order to prevent the electrolyte from being leaked out from the battery pack, the cells within the battery pack must be protected from damage. Within the battery pack, there are also included wires for sensors besides the cells. Therefore, an operator such as a user or a rescue worker not familiar with the internal structure of the battery pack cannot decide the position where the hole is to be bored.

It can also be expected that a hole previously bored has been closed with a bolt. However, it is rare that the battery pack is submerged in water or is broken due to a vehicle collision. But, rather, when the bolt is caused to drop off due to vibrations while the vehicle is running, the inside of the battery pack can be filled with water due to the splash of rainwater or the like. Or, when the bored hole is closed with the bolt, there is a possibility that the bolt can be fastened too firmly to be removed.

And, in a case where the battery pack is submerged in water, after the muddy water within the battery pack is drained therefrom or water is filled therein, finally, the water must be removed from inside the battery pack. This operation requires an efficient and sure procedure.

It is therefore one advantageous aspect of the present invention to provide an electric vehicle including a mechanism capable of efficiently carrying out a boring operation and an electrolyte draining operation for removing water or electrolyte from inside a battery pack.

According to one advantage of the invention, there is provided an electric vehicle, comprising:

a vehicle body having in a lower portion thereof a sign showing a specific position to be jacked up; and a battery pack mounted on the lower portion of the vehicle body and including a bottom wall having a mark showing a position where a liquid draining hole communicating with an inside of the battery pack is to be bored, wherein the mark is disposed at a position lower than the specific position within the vehicle body in a state where the vehicle body is inclined by jacking up the specific position.

The sign showing the specific position and the mark corresponding to the sign may include an indicator including at least one of the same identification symbols and identification colors.

The electric vehicle may be configured such that: the indicator applied to the specific position is a number showing an order for jacking up the specific position, and the indicator applied to the mark is a number showing an order for boring the liquid draining hole.

The specific position and the mark corresponding to the specific position may be consecutive numbers showing a procedure for jacking up the specific position and boring the liquid draining hole.

The mark may include a boring sign showing a range where the liquid draining hole is allowed to be bored.

The boring sign may be formed recessed from the bottom wall of the battery pack.

The boring sign may be filled with a colored soft synthetic resin.

The boring sing may be filled with phosphorescent synthetic resin.

The boring sign may include a center hole configured to catch a tip of a tool for boring the liquid draining hole.

The electric vehicle may be configured such that: the mark includes a rivet mounted onto the center hole so that at least a portion of the rivet is exposed, and the indicator including at least one of the identification symbols and the identification colors corresponding to the specific position is disposed in the exposed portion of the rivet.

The electric vehicle may be configured such that: the battery pack includes a plurality of battery cells and a case storing the battery cells with a clearance with respect to an outer periphery of the battery cells, and the liquid draining hole is bored to be communicated with the clearance.

The battery pack may include a protection wall interposed between a position where the liquid draining hole is bored and the battery cells.

The case may include a bottom surface gradually descending toward the liquid draining hole.

DETAILED DESCRIPTION OF THE INVENTION

Figure 5:
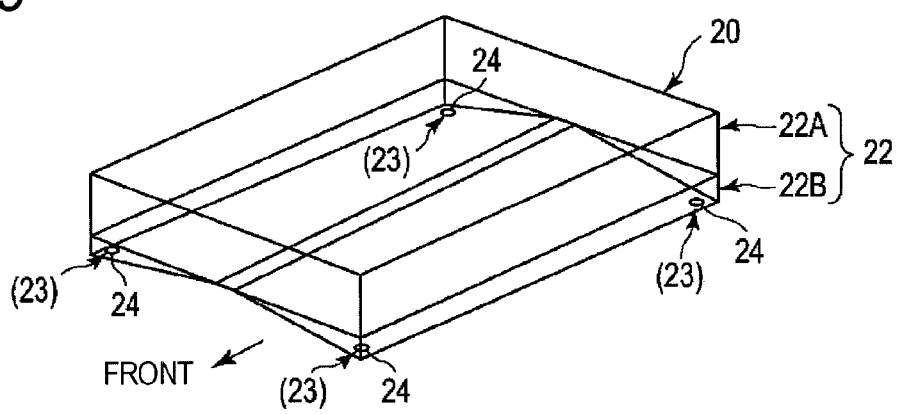
FIG. 5 is a typical perspective view of another modification of the battery pack of FIG. 3.
Figure 6:
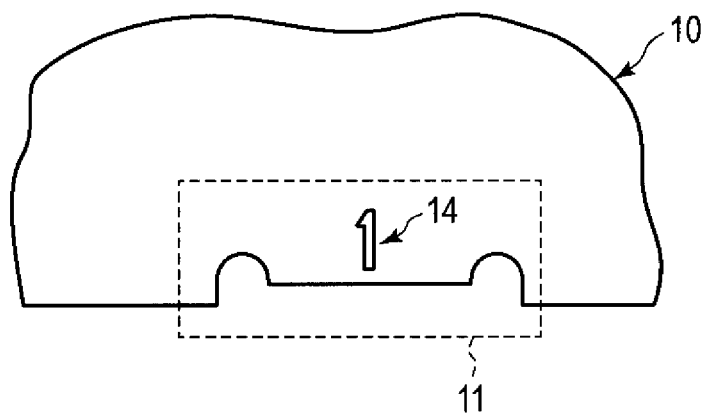
FIG. 6 is a side view of the electric vehicle shown in FIG. 2, with the specified position of the vehicle body thereof enlarged.

Now, description is given below of an electric vehicle 100 according to a first embodiment with reference to FIGS. 1 to 15. The electric vehicle 100 shown in FIG. 1 includes a vehicle body 10 and a battery pack 20. The vehicle body 10 has in its lower portion marks respectively showing specified positions 11. The specified positions 11 are positions for jacking up the tires 30 when tires 30 are replaced. Portions where the specified positions 11 are set are arranged as four portions which exist in the lower portion of the vehicle body 10 near tire houses 12 for the respective tires 30 and are shown by cross-hatching in FIGS. 1 and 2. The outline of the specific positions 11 is shown in FIG. 6.

Figure 1:
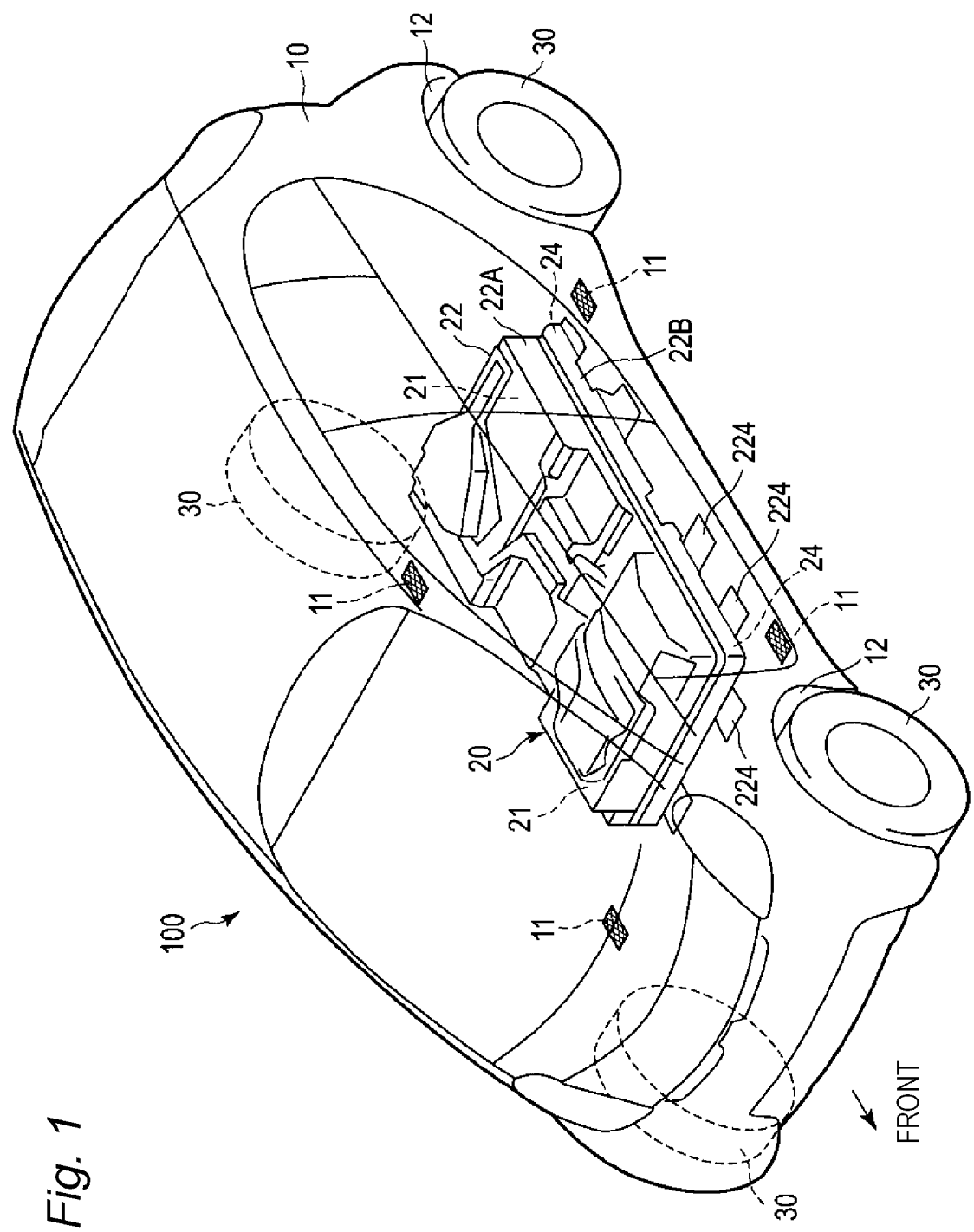
FIG. 1 is a perspective view of an electric vehicle according to a first embodiment of the invention.
Figure 2:
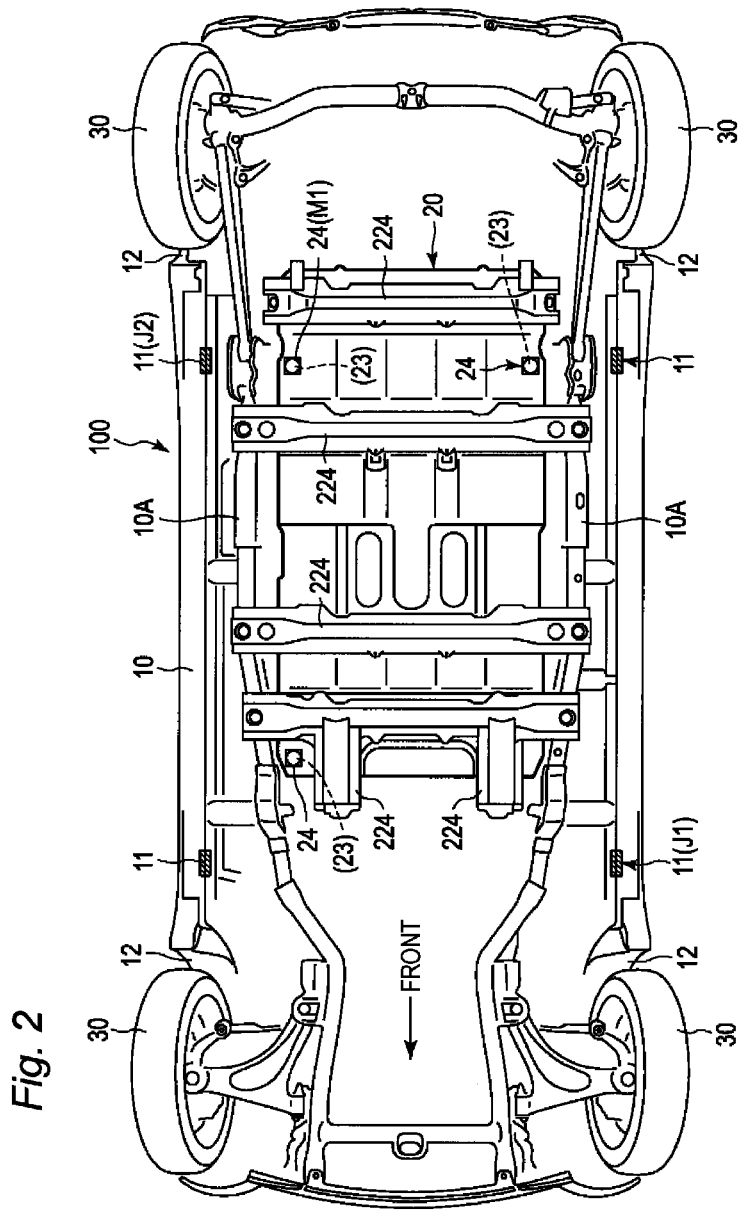
FIG. 2 is a bottom view of the electric vehicle shown in FIG. 1, in a state where a under-cover of the electric vehicle is removed.
Figure 3:
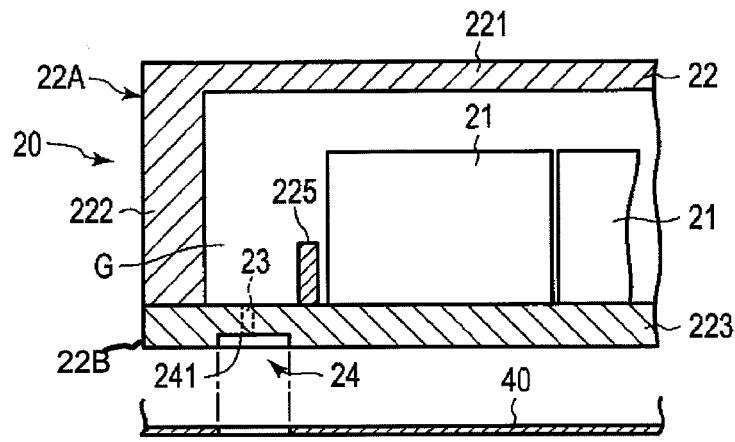
FIG. 3 is a section view of a battery pack shown FIG. 1, passing through the mark thereof.

The battery pack 20, as shown in FIGS. 1 and 2, is mounted on the substantially central lower portion of the vehicle body 10. This battery pack 20, as shown in FIG. 3, includes a plurality of battery cells 21 and a case 22 for storing these battery cells 21 therein. The battery cells 21 are lithium ion batteries, while the battery cells 21 are bundled together to form a module. The battery pack 20 includes a plurality of modules.

The case 22 includes: a cover 22A in which an upper wall 221 and a side wall 222 are formed as an integral body; and a tray 22B constituted of a bottom wall 223 and brackets 224 (FIG. 2) combined together. The cover 22A and tray 22B are fastened by bolts, with packings such as gaskets mounted along the outer peripheral portions thereof. The brackets 224, as shown in FIG. 2, are connected to the side member 10A of the vehicle body 10. The case 22 has a clearance G with respect to the outer peripheries of the battery cells 21. The case 22, for the purpose of sufficient strength and light weight, is made of, for example, glass fiber reinforced plastics or other fiber reinforced plastics (FRP) with an insert-molded metal plate. Also, as shown in FIG. 3, an under-cover 40 is mounted on the battery pack 20 from below to protect the battery pack 20.

The battery pack 20 includes, besides the battery cells 21, a power supply system provided within the case 22 for supplying power provided from the modules to a motor. The power supply system includes, for example, an inverter, a converter, and a charger for charging power provided from an ordinary commercial power supply to the battery cells 21.

The battery pack 20, as shown in FIGS. 2 and 3, further includes marks 24 for showing positions where liquid draining holes 23 communicating with the inside of the case 22 are bored. The marks 24 are provided at least in the bottom wall 223 of the battery pack 20 which, when the battery pack 20 is inclined by jacking up the specified positions 11, becomes lower than the specified positions 11. So long as the side wall 222 of the battery pack 20 can be seen from laterally of the electric vehicle 100, the marks 24 may also be provided on the side wall 222.

Each of the marks 24 respectively indicating the boring positions of the liquid draining holes 23 includes a boring sign 241 expressing a position where the liquid draining hole 23 corresponding to the boring sign 241 is to be bored. The boring sign 241 shows a range where the liquid draining hole 23 can be bored. That is, as long as within the range of the boring sign 241, wherever the liquid draining hole 23 is bored, it does not interfere with the battery cells 21 or other parts existing within the battery pack 20. Therefore, the sizes of the respective boring signs 241 may not be always the same. Each boring sign 241, as shown in FIG. 3, is formed as a recess dented slightly from the surface of the bottom wall 223 of the battery pack 20.

After a tool such as a drill to be used when boring the liquid draining hole 23 penetrates through the bottom wall 223, in order to prevent the tool from damaging the battery cells 21 and other parts disposed within the battery pack 20, the liquid draining hole 23 is set to be bored at a position where the battery cells 21 or the like are not disposed. In the first embodiment, as shown in FIG. 3, the liquid draining hole 23 is set such that it is bored in the clearance G to be formed in the outer periphery of the battery cell 21. The battery pack 20 includes a protection wall 255 between the boring positions of the liquid draining holes 23 and battery cells 21 in order to protect the battery cells 21 and other parts existing near the liquid draining holes 23.

For a case where liquid such as mud, cloudy water or electrolyte existing within the battery pack 20 should be drained, the marks 24 are set at the positions which become lowest in the battery pack 20 when jacked up on the flatland. The liquid draining holes 23 may preferably be set at a plurality of positions but not at only one position, so that the liquid draining hole 23 can be selected according to the peripheral environment when jacking up. The peripheral environment includes, for example, a slightly inclined ground, and an environment where a jack cannot be set with respect to the specific positions. In the first embodiment, as shown in FIG. 2, the liquid draining holes 23 and the marks 24 are formed three apiece respectively corresponding to three of the four specific positions 11.

As a result, the liquid draining hole 23, when one specific position 11 is jacked up, is set at least in the bottom wall 223 of the battery pack 20 which is situated near at least one of the remaining specific positions 11 that are become lower than the jacked-up specified position 11. And, in the mark 24, the boring sign 241 is disposed at a position where this liquid draining hole 23 has been set.

In FIG. 2, the specific position 11 which is disposed near to the driver's seat is labeled as J1. The specific position 11 which is disposed near to a seat existing diagonally opposite to the driver's seat, that is a rear seat just behind a passenger seat, is labeled as J2. The mark 24 which corresponds to the specific position 11 (J1) is labeled as M1. The mark 24 (M1) is disposed in the bottom wall 223 of the battery pack near to the specific position 11 (J2). And, the liquid draining hole 23 to be bored in correspondence to the mark 24 (M1) is situated near the specific position 11 (J2).

Figure 4:
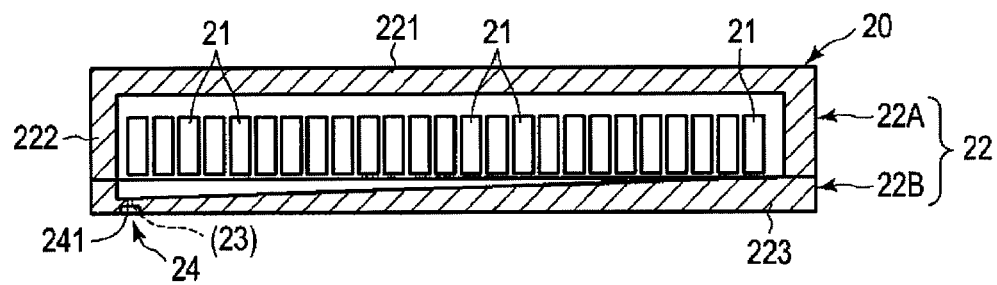
FIG. 4 is a section view of a modification of the battery pack of FIG. 3.

In this case, as shown in FIG. 4, when the upper surface of the tray 22B is inclined toward the liquid draining hole 23 to be bored according to the mark 24, the discharge of the liquid can be accelerated. Further, as shown in FIG. 5, the upper surface of the tray 22B may also be inclined such that it gradually descends from the central portion of the vehicle body 10 toward two outsides thereof in the width direction and backwardly from front of the vehicle body 10. In this case, the battery pack 20 includes marks 24 used at least to bore the liquid draining holes 23 in the two corner portions thereof situated backwardly of the vehicle body 10. The positions, where the marks 24 are provided, respectively exist near to the specific positions 11 to be provided in the rear portion of the vehicle body 10.

In order to clarify the liquid draining hole 23 corresponding to the jacked-up specific position 11 and the mark 24 for showing the boring position of the liquid draining hole 23, a sign for showing the specific position 11 and the mark 24 corresponding to it respectively have indicators 14, 242 containing at least one of the same identification symbols and the same identification colors. The indicator 14 to be applied to the specific position 11, as shown in FIG. 6, is disposed near a sign for showing the specific position 11, here, substantially centrally between two notches constituting a sign for showing the specific position 11. The indicator 14 may also be disposed at a position slightly shifted from the specific position 11, so that the indicator 14 can be seen even when jacked up.

Figure 7:
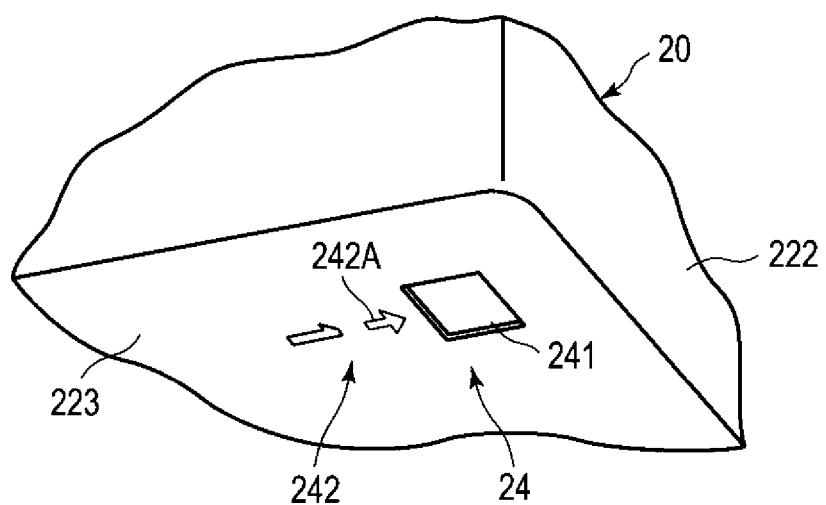
FIG. 7 is an enlarged perspective view of the mark of the battery pack of the electric vehicle shown in FIG. 2.

The mark 24 to be provided in the bottom wall 223 of the battery pack 20 correspondingly to the specific position 11 is shown in FIG. 7. This mark 24 includes the boring sign 241 for showing the position where the liquid draining hole 23 is to be bored, and an indicator 242 corresponding to the indicator 14 applied to the specific position 11. The indicator 242, as shown in FIG. 7, is disposed next to the boring sign 241. The boring sign 241 shown in FIG. 7 is formed as a recess slightly recessed from the outer surface of the bottom wall 223 so that an operator can touch to read the boring sign 241. The tray 22B constituting the bottom wall 223 of the battery pack 20 is made of FRP. Therefore, the indicator 242 may be recessed or swollen. Even when dirt attaches to the indicator 242, by wiping the dirt from the indicator 242, the indicator 242 can be read easily.

The indicator 14 of the specific position 11 and the indicator 242 of the mark 24 respectively shown in FIGS. 6 and 7 are numbers which are one form of identification signals. The indicators 14 and 242, instead of numbers, may also be replaced by hiragana, katakana or other characters like alphabet for example, or symbols. When numbers are used for the indicators 14 and 242, the sequence of the operation to bore the liquid draining holes 23 and the priority order for opening the liquid draining holes 23 can be related to each other. Further, when numbers or characters are employed as the indicators 14 and 242, the indicators 14 and 242 may also be retrography so as to be read correctly when reflected on a mirror, in order that they can be simply confirmed without an operator getting under the vehicle body 10 to see them.

To facilitate the identification of the indicators 14 and 242, they are recessed formed and a color different from the color of the vehicle body or its periphery, preferably, a complementary color may be used. In this case, colored resin may be filled in such a manner that the surfaces of the indicators 14 and 242 can be flush with the peripheries thereof. When the indicators 14 and 242 can be flush with the peripheries, dirt is hard to attach and, even when attached, the dirt is easy to remove.

The specific position 11 and mark 24 having the same indicators 14 and 242 correspond to each other. Therefore, for example, when the liquid draining hole 23 is bored in the boring indicator 241 of the mark 24 having the indicator 242 shown in FIG. 7 and the liquid within the battery pack 20 is discharged, the specific position 11 having the same indicator 14 shown in FIG. 6 as the indicator 242 may be jacked up.

Figure 8:
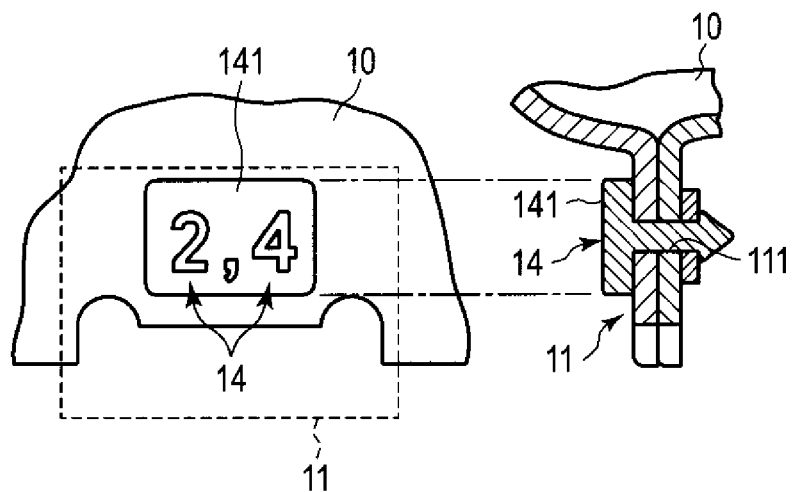
FIG. 8 is a side view and a section view of a modification of the specific position shown in FIG. 6.

The indicator 14 to be applied to the specific position 11 may also be mounted as a separate member depending on the relationship with the painting step and assembling step of the vehicle body. For example, as shown in FIG. 8, a lower hole 111 may be previously bored at the specific position 11 and a tag 141 having the indicator 14 may be thereafter mounted on the lower hole 111. When a colored tag is used as the indicator 14, the boring sign 241 of the corresponding mark 24 may simply be given the same color for easy confirmation of their corresponding relationship.

The specific position 11 and mark 24 may not correspond to each other one-on-one. For example, as shown in FIG. 8, one specific position 11 may also have two indicators 14. When conditions requiring the discharge of the battery pack 20 are different, or when the specifications of the battery pack 20 for the same vehicle type are different, in some cases, the liquid draining hole 23 boring order may be changed. In this case, simply by changing the colors of the respective indicators 14 to be displayed on the tag 141 or by changing the symbols thereof, various procedures can be set.

Figure 9:
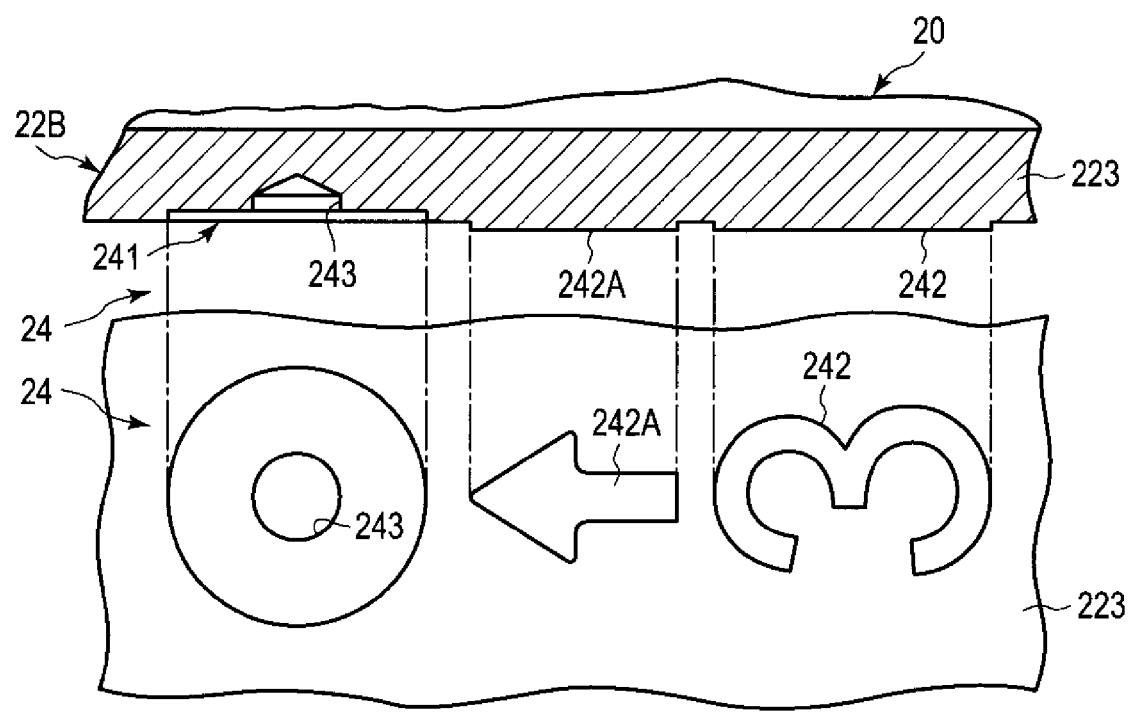
FIG. 9 is a section view and a bottom view of a modification of the mark shown in FIG. 7.

FIG. 9 shows the section view and bottom surface view of a modification of the mark 24 shown in FIG. 7. The boring sign 241 of the mark 24 has a circular shape which is slightly recessed from the surface of the bottom wall 223 of the battery pack 20. This boring sign 241 includes a center hole 243 in its central portion in order to facilitate the catching of the tip of a tool such as a drill used to bore the liquid draining hole 23. This center hole 243 is included in one type of recesses formed as the boring signs 241. The indicator 242 projects beyond the surface of the bottom wall 223. This indicator 242, similarly to the indicator 242 shown in FIG. 7, can be distinguished by numbers, while the boring sign 241 is shown by an arrow 242A. The direction of the arrow 242A may also be the direction to the corresponding specific position 11, instead of the direction of the boring sign 241. In the case that the arrow 242A indicates the corresponding specific position 11, the specific position 11 to be jacked up after the liquid draining hole 23 is bored can be confirmed, thereby being able to enhance the operation efficiency.

Figure 10:
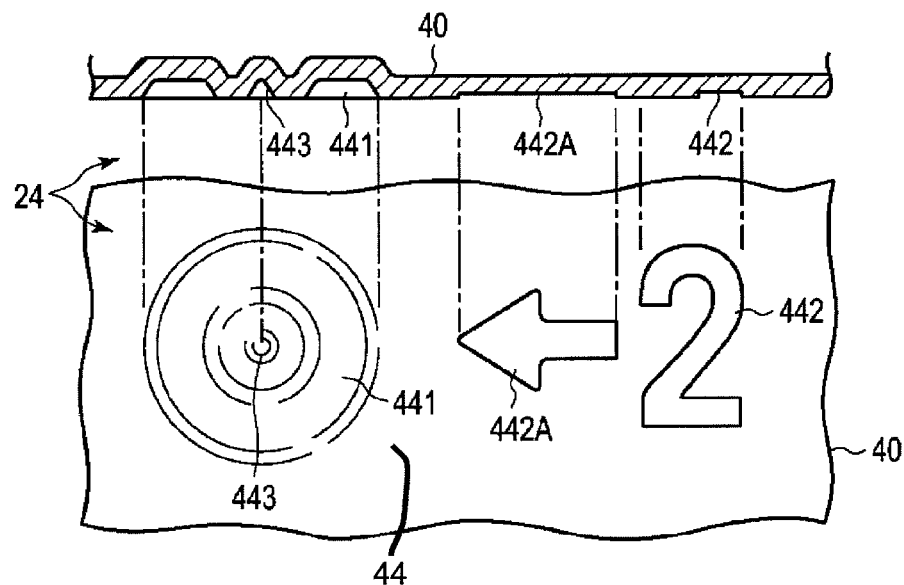
FIG. 10 is a section view and a bottom view of a modification of an under-cover shown in FIG. 3.

When the under-cover 40 is further mounted under the battery pack 20, a vertical projection area corresponding to the boring sign 241 of the mark 24 may be cut out as shown in FIG. 3, or an outer-mark 44 may be provided as shown in FIG. 10. FIG. 10 shows a section view and a bottom view of the under-cover 40 with the outer-mark 44 mounted thereon. This outer-mark 44 includes an outer sign 441 disposed in a projection position corresponding to the boring sign 241, and an outer indicator 442 having the same display as the specific position 11 corresponding to the liquid draining hole 23 to be bored according to this outer sign 441. Information to be displayed on the outer indicator 442 is the same as information to be displayed on the indicator 242 of the mark 24 to be provided on the bottom wall 223 of the battery pack 20. That is, similarly to the arrow 242A applied together with the indicator 242, an arrow 442A is applied to the under-cover 40 together with the outer indicator 442.

As shown in FIG. 10, the outer sign 441 and outer indicator 442 are formed simultaneously when the under-cover 40 is press formed. Similarly to the boring sign 241, the outer sign 441 has a circular shape slightly recessed from the outer surface of the under-cover 40. This outer sign 441 has a central portion raised to be substantially flush with the outer surface of the under-cover 40 and includes in its center a dimple 443 recessed toward the battery pack 20. This dimple 443 has the same function as the center hole 243 of the boring sign 241 shown in FIG. 9, that is, the function to facilitate the catching of the tip of the tool such as a drill.

To bore the liquid draining hole 23, a tool such as a drill may be penetrated through the dimple 443 of the outer sign 441 of the under-cover 40 and the tip of the tool may be then matched to the center hole 243 of the boring sign 241 of the battery pack 20. A hole opened up in the under-cover 40 functions as a guide, thereby facilitating the boring of the liquid draining hole 23 in a specified direction. Therefore, after the liquid draining hole 23 is bored, the battery cells 21 or other parts within the battery pack 20 can be prevented from being damaged by the tip of the tool.

Here, when the outer shape of a tool used is smaller than the diameter of a liquid draining hole 23 required, as long as within the range of the boring sign 241 and outer sign 441, a plurality of liquid draining holes 23 may also be bored. Also, as a precondition for a plurality of liquid draining holes 23, a plurality of center holes 243 and dimples 443 may also be formed previously. In the case that the center holes 243 and the dimples 443 are formed, in order to prevent the wrong corresponding combinations thereof, a guide sleeve may also be interposed previously between the bottom wall 223 of the battery pack 20 and under-cover 40.

Figure 11:
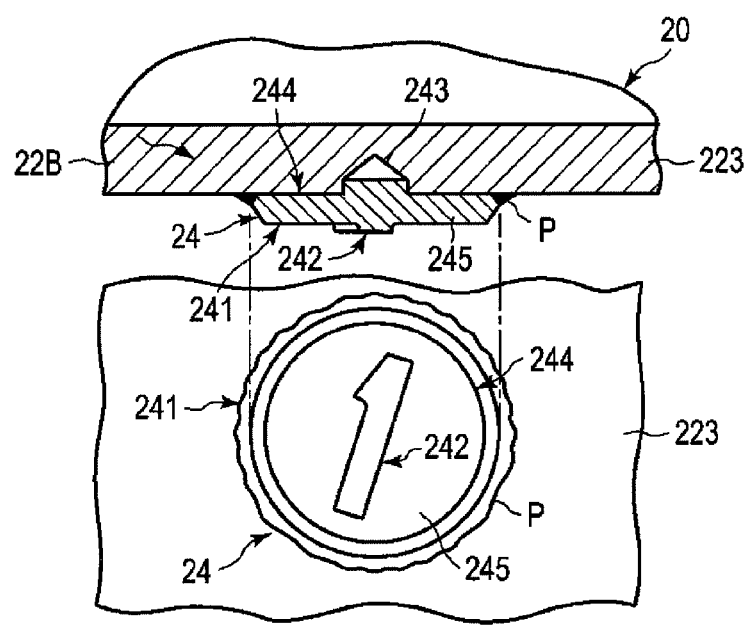
FIG. 11 is a section view and a bottom view of a modification of the mark shown in FIG. 7.
Figure 12:
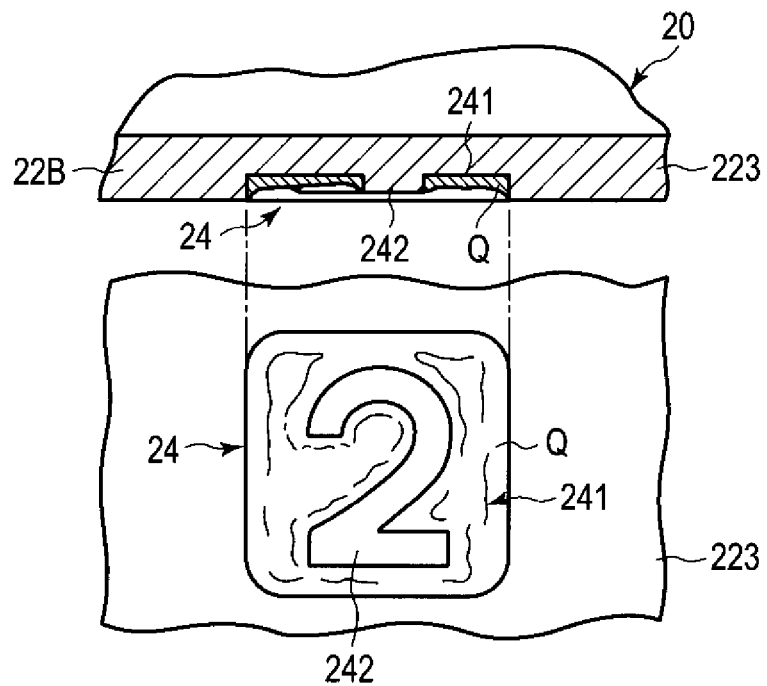
FIG. 12 is a section view and a bottom view of a modification of the mark shown in FIG. 7.

The mark 24 may also have the indicator 242 at the same position as the boring sign 241. FIGS. 11 and 12 respectively show a section view and a bottom view of modifications of the mark 24 having the indicator 242 at the same position as the boring sing 241.

The mark 24 shown in FIG. 11 includes a rivet 244 to be mounted on the center hole 243. The rivet 244 is formed such that at least a portion thereof is exposed from the center hole 243. The rivet 244 shown in FIG. 11 includes a shade portion 245 which spreads circularly along the bottom wall 223 of the battery pack 20 with the center hole 243 as its center. The indicator 242 of the mark 24 is disposed in this shade portion 245. Also, the shade portion 245 has a size necessary for the boring sign 241 providing an area where the liquid draining hole 23 can be bored. In order to prevent the rivet 244 against removal due to vibrations or the like produced while the electric vehicle 100 is running, the outer periphery of the shade portion 245 is firmly fixed by synthetic resin P such as adhesive, putty or coking material.

When boring the liquid draining hole 23, the rivet 244 is removed by a wedge-shaped tool such as a minus-type driver or a spatula. Then, the liquid draining hole 23 is bored in the thus exposed center hole 243 using a tool such as a drill. In the case that the rivet 244 is made of sufficiently soft material with respect to a tool for boring the liquid draining hole 23, the liquid draining hole 23 may also be bored by using a tool without removing the rivet 244.

In the case of the mark 24 shown in FIG. 11, only the center hole 243 is formed in the bottom wall 223 of the pack 20, while the boring sign 241 and indicator 242 are formed on the rivet 244. In the case that the battery pack 20 is employed in common in a plurality of types of vehicles, even when pieces of information to be displayed on the indicators 242 are different according to the vehicle types, by changing the rivet 244, the battery pack 20 is allowed to be used in this case easily.

Also, since the rivet 244 is mounted on the center hole 243, the rivet 244 can be fixed while freely changing the direction thereof. Therefore, a similar function to the arrow 242A of the mark 24 shown in FIG. 9 can be added to the rivet 244. For example, a notch or a projection may be formed in the outer peripheral portion of the shade portion 245, and the rivet 244 may be fixed with such notch or projection facing a specific position 11 corresponding to this mark. Or, the rivet 244 may also be fixed in such a manner that the upper portions of characters to be displayed as the indicator 242 face the specific position 11 corresponding to this mark 24.

In the mark 24 shown in FIG. 12, the boring sign 241 and indicator 242 are formed integrally. The boring sign 241 is a recess recessed from the surface of the bottom wall 223 of the battery pack 20 and indicates a range where the liquid draining hole 23 can be bored. The indicator 242 projects beyond the boring sign 241 within the range of the boring sign 241. Also, the recess of this mark 24 representing the boring sign 241 other than the portion where the indicator 242 is filled with synthetic resin Q colored with color easy to be visually confirmed. In the case that the synthetic resin Q is made of soft material, even when dirt is stuck to the boring sign 241 of the mark 24, the dirt can be removed easily.

Further, the boring sign 241 may also be filled with synthetic resin Q mixed with phosphorescent material together with or without the coloring matter. By applying light to the mark 24 for a while using a lamp such as a flashlight, since the synthetic resin Q contains the phosphorescent material, the mark 24 can be distinguished easily even at night. In this case, since the indicator 242 is disposed within the range of the boring sign 241, the indicator 242 is also easy to distinguish.

In the electric vehicle 100 in which the mark 24 is provided in the battery pack 20 in the above manner, in the case that the battery pack 20 is submerged or is broken due to a vehicle collision, in order to bore the liquid draining hole 23 using a tool such as a drill and to drain mud, cloudy water or electrolyte within the battery pack 20 quickly therefrom, there are necessary a series of operations as follows. Firstly, for easy execution of a boring operation, the vehicle body 10 is jacked up using the specific position 11 existing near to the boring position of the liquid draining hole 23. After the liquid draining hole 23 is bored, a jack is returned to its original position. Finally, the specific position 11 corresponding to the mark 24 indicating the position of the bored liquid draining hole 23 is jacked up, thereby promoting the drain of the mud, cloudy water or electrolyte within the battery pack 20 from the liquid draining hole 23.

In the case that the liquid draining hole 23 is bored in only one of the a plurality of marks 24, the above procedure may be executed on any one of the marks. However, when the above series of operations are executed separately on all of the marks 24 provided in three portions, the specific positions must be jacked up once before and after whenever the liquid draining holes 23 are opened up, requiring a total of 6 times of jack-up operations. Thus, in the case that the marks 24 are provided in three portions and the liquid draining holes 23 are bored in all of the three marks 24, a procedure for executing the boring operation efficiently is necessary, which is described below using the following examples 1 to 3.

Figure 13:
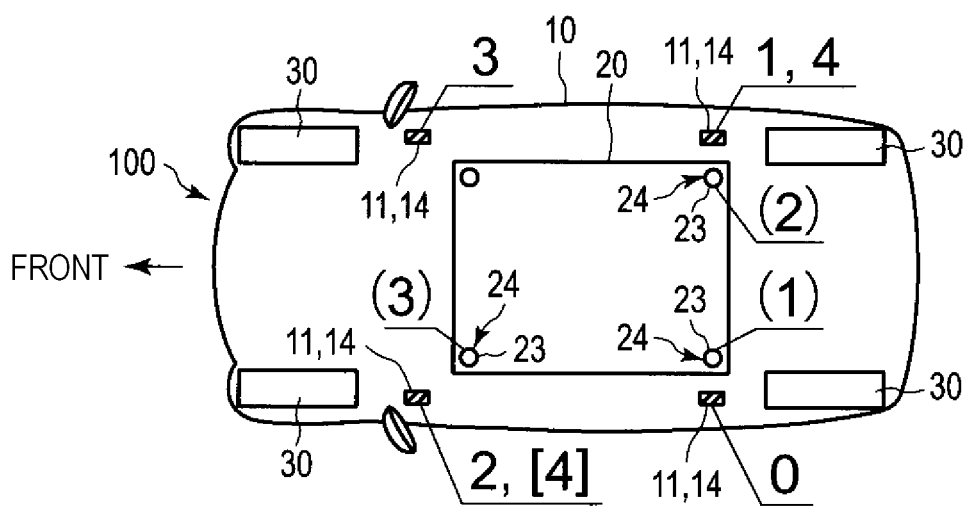
FIG. 13 is a view of a first example of a boring operation to make a hole in the battery pack of the electric vehicle shown in FIG. 1.

In the electric vehicle 100 in which the battery pack 20 is disposed in the center of the vehicle body 10, a first example of a procedure for boring the liquid draining hole 23 in the battery pack 20 is described with reference to FIG. 13. FIG. 13 shows the display of indicators 14 respectively applied to specific positions 11 when the electric vehicle 100 is viewed from above, and the display of indicators 242 respectively applied to marks 24. The displays of the indicators 14 and 242 respectively show the order for jacking up the specific positions 11 and the order for boring the liquid draining holes 23.

In the first example, firstly, the specific position 11 in the left rear portion which is expressed as "0" in the indicator 14 is jacked up. Using a tool such as a drill, the liquid draining hole 23 is bored in the boring sign 241 of the mark 24 which is expressed as "(1)" in the indicator 242 existing near to the jacked-up specific position 11 in the left rear portion, and a jack is then moved down. Next, the specific position 11 in the right rear portion expressed as "1" correspondingly to the "(1)" expressed in the indicator 242 is jacked up. As a result, the mud, cloudy water or electrolyte within the battery pack 20 is discharged from the liquid draining hole 23 of the indicator 242 of "(1)".

Since the specific position 11 where the display of the indicator 14 is "1" is jacked up, using a tool such as a drill, the liquid draining hole 23 is bored in the boring sign 241 of the mark 24 in the right rear portion expressed as "(2)" in the indicator 242 existing near to the jacked-up position 11. The jack supporting the specific position 11 where the display of the indicator 14 is "1" is lowered, and the specific position 11 in the left front portion where the display of the indicator 14 is "2" correspondingly to the indicator 242 of "(2)" is jacked up. Consequently, the mud, cloudy water or electrolyte within the battery pack 20 is drained also from the liquid draining hole 23 of the indicator 242 of "(2)".

Using a tool such as a drill, the liquid draining hole 23 is bored in the boring sign 241 of the mark 24 in the left front portion expressed as "(3)" in the indicator 242 existing near to the jacked-up specific position 11 expressed as the indicator 14 of "2". The jack supporting the jacked-up specific position 11 expressed as the indicator 14 of "2" is then lowered, and the specific position 11 in the right front portion expressed as "3" in the indicator 14 correspondingly to the indicator 242 of "(3)" is jacked up. Consequently, the mud, cloudy water or electrolyte within the battery pack 20 is drained also from the liquid draining holes 23 of the indicators 242 of "(1)", "(2)", "(3)".

Finally, instead of a jack, a stand is inserted into the specific position 11 in the right front portion where the indicator 14 of "3" is applied, and the specific position 11 in the right rear portion where the indicator 14 of "4" is applied is jacked up. Consequently, the mud, cloudy water or electrolyte within the battery pack 20 is drained from the liquid draining holes 23 of the indicators 242 of "(1)" and "(3)". The position to be jacked up finally may also be the specific position 11 in the left front portion where the indication of "[4]" is applied in FIG. 13, instead of the specific position 11 in the right rear portion where the indicator 14 of "4" is applied. Since the specific position 11 is lifted up in such a manner that the two adjoining liquid draining holes 23 are lowered, the attitude of the vehicle body 10 of the electric vehicle 100 can be stabilized.

When the battery pack 20 of the electric vehicle 100 is submerged, since the mud, cloudy water and the like have been entered the battery pack 20, they must be drained. After then, the liquid draining holes 23 are closed and the battery pack 20 is filled with purified water and is electrically discharged. In the case that the battery cells 21 within the battery pack 20 are broken due to the collision of the electric vehicle 100, since electrolyte has flowed into the battery pack 20, similarly, the electrolyte must be drained. After then, the liquid draining holes 23 are closed and the battery pack 20 is filled with purified water and is electrically discharged. In both cases, after the battery pack 20 is electrically discharged, the liquid draining holes 23 are opened for discharging water therefrom. Consequently, the electric vehicle 100 can be handled safely with no worry about electric leakage from the battery pack 20.

Figure 14:
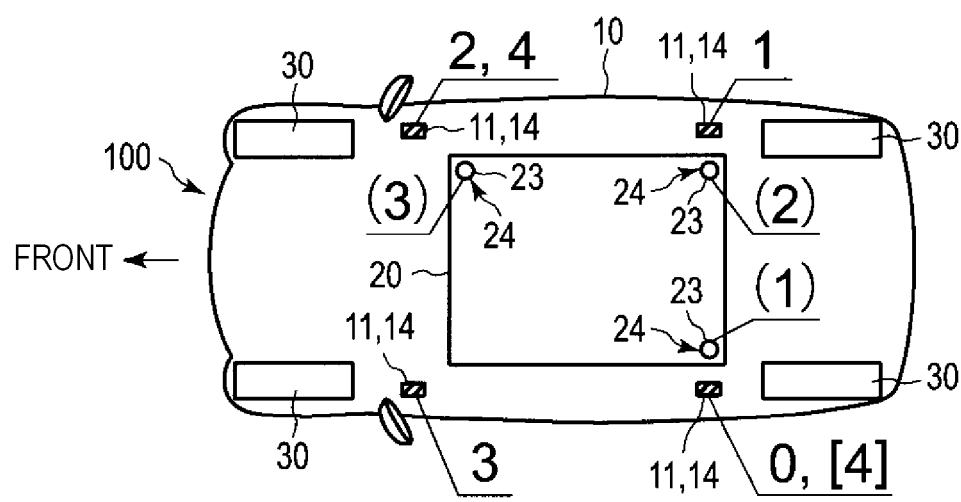
FIG. 14 is a view of a second example of a boring operation to make a hole in the battery pack of the electric vehicle shown in FIG. 1.

In the electric vehicle 100 in which the battery pack 20 is disposed in the center of the vehicle body 10, an example 2 of a procedure for boring the liquid draining hole 23 in the battery pack 20 is described with reference to FIG. 14. FIG. 14, similarly to the first example, shows the display of indicators 14 respectively applied to specific positions 11 when the electric vehicle 100 is viewed from above, and the display of indicators 242 respectively applied to marks 24. The displays of the indicators 14 and 242 respectively show the order for jacking up the specific positions 11 and the order for boring the liquid draining holes 23.

The example 2 is different from the first example in that the position of the mark 24 having "(3)" in the indicator 242 exists in the right front portion. Thus, the specific position 11 expressed as "2" is disposed in the right front portion. Also, the indicator 14 of "3" corresponding to the indicator 242 of "(3)" is disposed in the left front portion. In FIG. 14, the indicator 14 of "4" to be jacked up finally is disposed in the same specific position 11 in the right front portion as the indicator 14 of "2". Since the specific position 11 may be lifted up in such a manner that the two adjoining liquid draining holes 23 are lowered, the indicator 14 of "[4]" in the left rear portion where the indicator 14 of "0" is disposed may also be jacked up instead of the indicator 14 of "4" in the right front portion.

Figure 15:
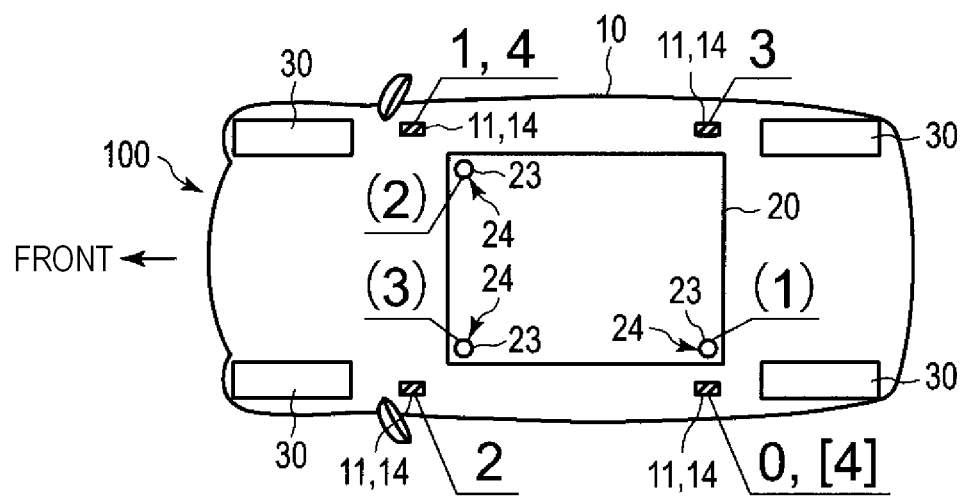
FIG. 15 is a view of a third example of a boring operation to make a hole in the battery pack of the electric vehicle shown in FIG. 1.

In the electric vehicle 100 in which the battery pack 20 is disposed in the center of the vehicle body 10, an example 3 of a procedure for opening up the liquid draining hole 23 in the battery pack 20 is described with reference to FIG. 15. FIG. 15, similarly to the examples 1 and 2, shows the display of indicators 14 respectively applied to specific positions 11 when the electric vehicle 100 is viewed from above, and the display of indicators 242 respectively applied to marks 24. The displays of the indicators 14 and 242 respectively show the order for jacking up the specific positions 11 and the order for opening up the liquid draining holes 23.

The example 3 is different from the first example in that the position of the mark 24 having "(2)" in the indicator 242 exists in the right front portion. Thus, the specific position 11 expressed as "1" is disposed in the right front portion. Also, after the liquid draining hole 23 is bored according to the mark 24 having the indicator 242 of "(3)" disposed in the left front portion, the indicator 14 of "3" to be jacked up is disposed in the specific position 11 in the right rear portion, and the indicator 14 of "4" to be jacked up finally is disposed in the same specific position 11 in the right front portion as the indicator 14 of "1".

In FIG. 15, the specific position 11 may be lifted up in such a manner that the two adjoining liquid draining holes 23 are lowered. Therefore, the indicator 14 of "4" to be jacked up finally may also be the indicator 14 of "[4]" in the left rear portion where the indicator 14 of "0" is disposed.

Figure 16:
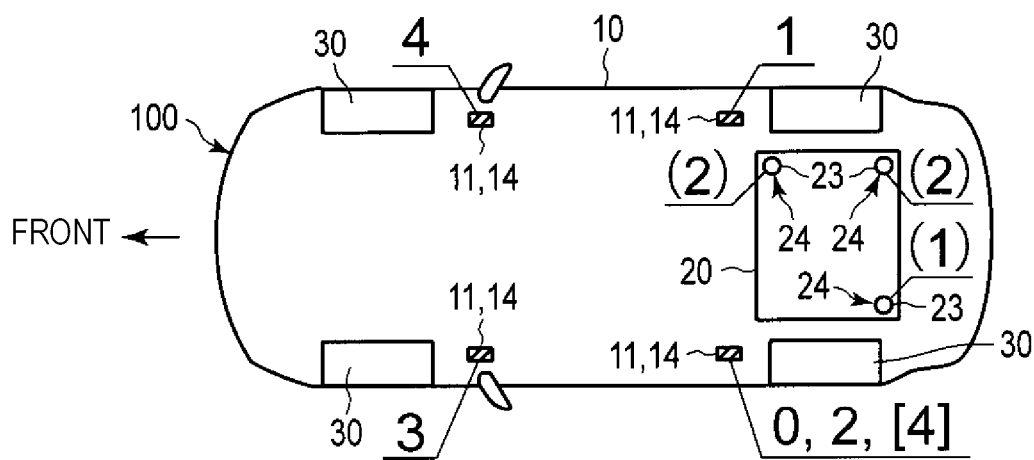
FIG. 16 is a view of a boring operation to make a hole in the battery pack of an electric vehicle according to a second embodiment of the invention.

Now, description is given of an electric vehicle 100 according to a second embodiment of the invention with reference to FIG. 16. As shown in FIG. 16, in this electric vehicle 100, a battery pack 20 is interposed between the rear tires 30 of a vehicle body 10. The details of signs for expressing specific positions 11 applied to the vehicle body 10 of the electric vehicle 100 and marks 24 applied to the battery pack 20 are the same as described in the first embodiment. Therefore, the signs for the specific positions 11 and marks 24, in FIG. 16, are given the same designations as the signs for the specific positions 11 and marks 24 in the first embodiment, while the specific description thereof selectively quotes the description in the first embodiment for reference.

In this electric vehicle 100, a procedure for boring the liquid draining hole 23 in the battery pack 23 is described with reference to FIG. 16. The specific position 11 in the left rear portion expressed as "0" in the indicator 14 is jacked up and the liquid draining hole 23 is bored according to the mark 24 of the indicator 242 of "(1)" existing in the left rear portion of the battery pack 20. Next, the specific position 11 in the right rear portion expressed as "1" in the indicator 14 is jacked up. Then, mud, cloudy water or electrolyte is drained from the liquid draining hole 23 in the left rear portion and two liquid draining holes 23 are bored according to the marks 24 of the indicators 242 of "(2)" respectively existing in the right front portion and right rear portion of the battery pack 20.

In the second embodiment, the battery pack 20 is interposed between the rear tires 30. Therefore, the indicator of "2" corresponding to the indicator 242 of "(2)" is disposed at the same left rear portion specific position 11 as the indicator 14 of "0". By jacking up the specific position 11 having this indicator 14 of "2", mud, cloudy water or electrolyte within the battery pack 20 is drained from the liquid draining hole 23 formed at the position having the indicator 242 of "(2)".

Finally, the specific position 11 having the indicator 14 of "3" in the left front portion and the specific position 11 having the indicator 14 of "4" in the right front portion are respectively jacked up, whereby mud, cloudy water or electrolyte within the battery pack 20 is drained from the liquid draining holes 23 formed in the right rear portion and in the left rear portion. Instead of jacking up the specific position 11 having the indicator 14 of "4" in the right front portion, the specific position 11 having the indicator 14 of "[4]" in the same left rear portion as the indicators 14 of "0" and "2" shown in FIG. 17 may also be jacked up, whereby mud, cloudy water or electrolyte within the battery pack 20 may be drained from the liquid draining holes 23 formed at the position having the indicator 242 of "(2)". In this case, after the specific position 11 having the indicator 14 of "2" is jacked up, a stand is inserted into this specific position 11 and the specific position 11 having the indicator 14 of "3" is jacked up higher than the stand of the specific position 11 having the indicator 14 of "2". This can omit a jack-up operation involved with the indicator 14 of "[4]" applied to the same specific position 11 as the indicator 14 of "2".

Figure 17:
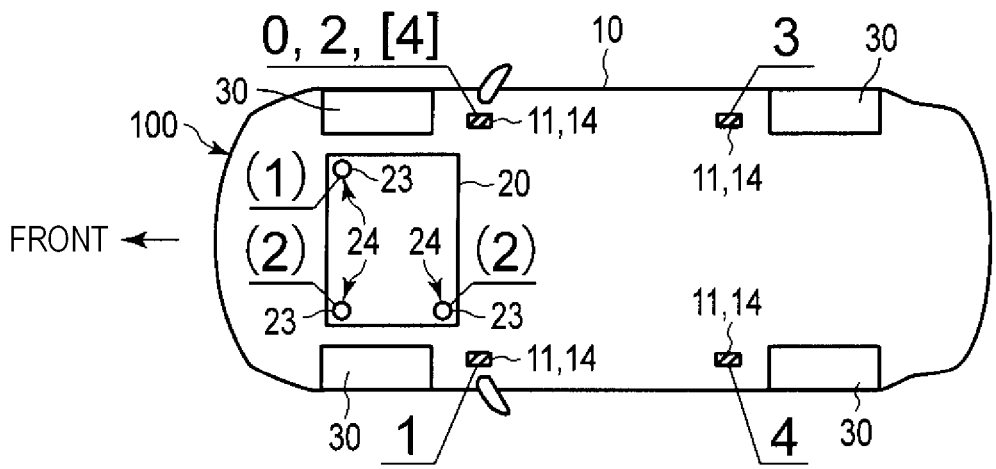
FIG. 17 is a view of a boring operation to make a hole in the battery pack of an electric vehicle according to a third embodiment of the invention.

Now, an electric vehicle 100 according to a third embodiment of the invention is described with reference to FIG. 17. As shown in FIG. 17, in this electric vehicle 100, the battery pack 20 is interposed between the front tires 30 of the vehicle body 10. The details of signs for expressing specific positions 11 applied to the vehicle body 10 of the electric vehicle 100 and marks 24 applied to the battery pack 20 are the same as described in the first embodiment. Therefore, the signs for the specific positions 11 and marks 24, in FIG. 17, are given the same designations as the signs for the specific positions 11 and marks 24 in the first embodiment, while the specific description thereof selectively quotes the description in the first embodiment for reference.

In this electric vehicle 100, a procedure for boring the liquid draining hole 23 in the battery pack 23 is described with reference to FIG. 17. In the electric vehicle 100 of the third embodiment, the positions of liquid draining holes 23 to be bored according to the specific positions 11 having the indicators 14 of "0" to "4" and two indicators 242 of "(1)" and "(2)" are set to be 180° rotational symmetry about the gravity of center of the vehicle body 10 with respect to the positions in the electric vehicle 100 of the second embodiment. Therefore, the description in the second embodiment is employed here while changing the meanings of the terms, for example, "front" to "rear", "rear" to "front", "right" to "left", and "left" to "right", and thus the description of the third embodiment is omitted here.

In the first to third embodiments, the indicators 14 of the specific positions 11 express the order for jack up such positions, while the indicators 242 of the marks 24 express the order for boring the liquid draining holes 23. The indicators 14, 242 may also be set for consecutive numbers providing a series of procedures for boring the liquid draining holes 23 and jacking up the specific positions 11 from the specific position 11 having the indicator 14 of "0".

The vehicle body 10 jack-up order and the liquid draining hole 23 boring operation order described in the examples 1 to 3 of the first embodiment, second and third embodiments are only example to facilitate the understanding of the invention. Therefore, the invention is not limited to the above orders.

According to the electric vehicle of the invention, the battery pack has a mark thereon for indicating a position thereof which, when the specific position marked on the vehicle body is jacked up, becomes lower than the specific position and in which the liquid draining hole is to be bored. After the liquid draining hole is bored in the battery pack, by jacking up a specific position corresponding to this liquid draining hole, a boring operation and a water draining operation to drain water having invaded into the battery pack and electrolyte having leaked from therefrom can be carried out efficiently.

What is claimed is:

1. An electric vehicle, comprising:
    a vehicle body having in a lower portion thereof a sign showing a specific position to be jacked up; and
    a battery pack mounted on the lower portion of the vehicle body and including a bottom wall having a mark showing a position where a liquid draining hole communicating with an inside of the battery pack is to be bored in the bottom wall,
    wherein the bottom wall extends over the position where the liquid draining hole is to be bored, and
    wherein the mark is disposed at a position lower than the specific position within the vehicle body in a state where the vehicle body is inclined by jacking up the specific position.

2. The electric vehicle according to claim 1, wherein
    the sign showing the specific position and the mark corresponding to the sign include an indicator including at least one of the same identification symbols and identification colors.

3. The electric vehicle according to claim 2, wherein
the indicator applied to the specific position is a number showing an order for jacking up the specific position, and
the indicator applied to the mark is a number showing an order for boring the liquid draining hole.

4. The electric vehicle according to claim 1, wherein
the specific position and the mark corresponding to the specific position are consecutive numbers showing a procedure for jacking up the specific position and boring the liquid draining hole.

5. The electric vehicle according to claim 1, wherein
the mark includes a boring sign showing a range where the liquid draining hole is allowed to be bored.

6. The electric vehicle according to claim 5, wherein
the boring sign is formed recessed from the bottom wall of the battery pack.

7. The electric vehicle according to claim 5, wherein
the boring sign is filled with a colored soft synthetic resin.

8. The electric vehicle according to claim 5, wherein
the boring sign is filled with phosphorescent synthetic resin.

9. The electric vehicle according to claim 5, wherein
the boring sign includes a center hole configured to catch a tip of a tool for boring the liquid draining hole.

10. The electric vehicle according to claim 9, wherein
the mark includes a rivet mounted onto the center hole so that at least a portion of the rivet is exposed, and
the indicator including at least one of the identification symbols and the identification colors corresponding to the specific position is disposed in the exposed portion of the rivet.

11. The electric vehicle according to claim 1, wherein
the battery pack includes a plurality of battery cells and a case storing the battery cells with a clearance with respect to an outer periphery of the battery cells, and
the liquid draining hole is bored to be communicated with the clearance.

12. The electric vehicle according to claim 11, wherein
the battery pack includes a protection wall interposed between a position where the liquid draining hole is bored and the battery cells.

13. The electric vehicle according to claim 11, wherein
the case includes a bottom surface gradually descending toward the liquid draining hole.

* * * * *